United States Patent [19]

Brinkruff et al.

[11] Patent Number: 5,040,724
[45] Date of Patent: Aug. 20, 1991

[54] ELECTRONIC CONTROL SYSTEM FOR AN OVEN

[75] Inventors: David A. Brinkruff, Goshen; Gerald A. Kilgour, Kokomo, both of Ind.

[73] Assignee: Eaton Corporation, Cleveland, Ohio

[21] Appl. No.: 449,271

[22] Filed: Dec. 11, 1989

[51] Int. Cl.⁵ .............................................. H05B 1/02
[52] U.S. Cl. ................................ 236/15 A; 236/78 D; 307/359; 219/501
[58] Field of Search ................... 236/78 D, 15 A; 307/310, 359; 165/26, 27; 219/501

[56] References Cited

U.S. PATENT DOCUMENTS

| | | | |
|---|---|---|---|
| 3,678,247 | 7/1972 | Sawa et al. | 219/501 |
| 3,700,933 | 10/1972 | Harkenrider et al. | 219/501 X |
| 3,917,993 | 11/1975 | Picmaus et al. | 307/310 X |
| 3,924,101 | 12/1975 | Beard | 219/490 |
| 4,172,982 | 10/1979 | Kompelien | 307/117 |
| 4,259,601 | 3/1981 | Stein | 307/359 |
| 4,277,671 | 7/1981 | Mori et al. | 219/494 |
| 4,446,359 | 5/1984 | Arribas et al. | 219/485 |
| 4,524,264 | 6/1985 | Takeuchi et al. | 219/497 |
| 4,607,153 | 8/1986 | Ang et al. | 219/497 |
| 4,660,057 | 4/1987 | Watanabe et al. | 346/140 |
| 4,692,259 | 9/1987 | Yoshida et al. | 219/497 |
| 4,775,777 | 10/1988 | Sinn | 219/397 |
| 4,852,544 | 8/1989 | Williams et al. | 126/39 B A |
| 4,853,519 | 8/1989 | Tanaka et al. | 219/497 |

Primary Examiner—William E. Wayner
Attorney, Agent, or Firm—R. A. Johnston

[57] ABSTRACT

An electronic oven temperature regulator employing a comparator to control energization of a relay for cycling the oven heating unit (gas or electric) in response to comparison of an oven temperature sensor output and a user selected reference temperature about which regulation is desired. A reversible polarity voltage regulator provides feedback from the comparator output to the input to provide a positive and negative hysteresis dead band about the selected regulation temperature for minimizing cycling or "hunting" of the heating unit. A fault comparator tracks the selected reference temperature to disable the heating element relay in the event of a short in the temperature sensor.

9 Claims, 1 Drawing Sheet

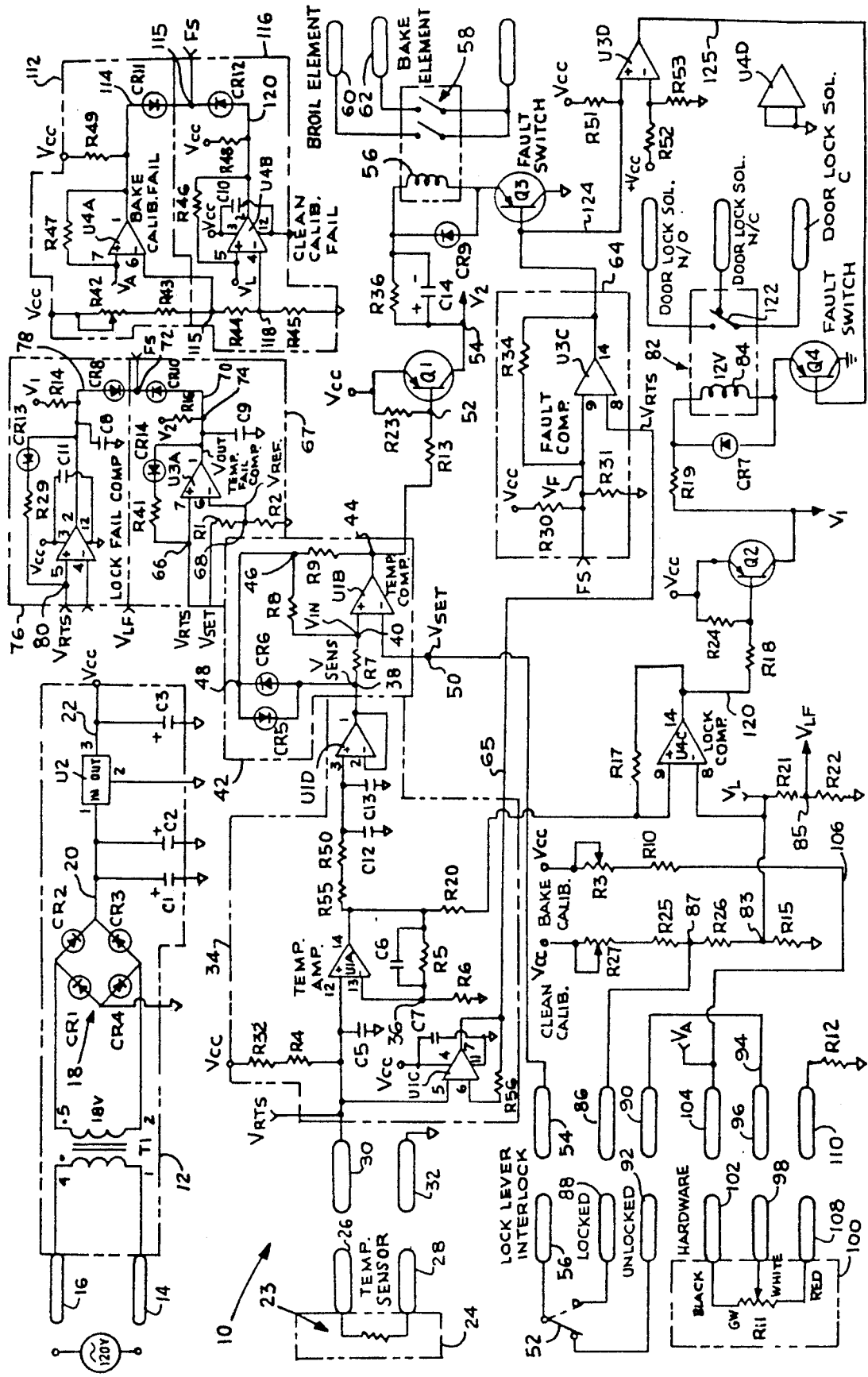

5,040,724

ELECTRONIC CONTROL SYSTEM FOR AN OVEN

BACKGROUND OF THE INVENTION

The present invention relates to temperature regulation of an oven and particularly household ranges having a user positioned control selectively moved to a position indicative of a desired oven temperature. Typically, oven temperature regulators employ a liquid filled temperature sensing bulb and tube which utilizes the pressure forces of the expanding liquid in the bulb and tube to move a diaphragm disposed to actuate a switch or other control mechanism for controlling the oven heating unit or element. In ovens employing electric resistance heating units, the fluid actuated diaphragm typically operates a switch or relay for controlling current to the heating element. The user control is typically arranged to apply a preload or preset condition to the diaphragm/switch operating mechanism. In ovens employing a fuel gas burning heating unit or burner, the diaphragm may move to operate a mechanism for mechanically controlling fuel flow in a valve.

Alternatively, a bimetallic sensing element has been employed for sensing oven temperature for moving an electrical contact to open and close a circuit to an electric oven heating unit. In the case of a fuel gas burner oven heating unit, a bimetallic element has been employed to control a movable valve member for controlling fuel flow to the burner in response to the sensed oven temperature. In some applications the bimetallic element is heated by an electrical current responsive to a thermistor in the oven for sensing oven temperature; and the bimetallic element mechanically operates the fuel gas valve or an electrical relay for energizing an electrically operated fuel valve.

In the aforementioned control systems for regulating oven temperature, mechanical motion of either a heat pressure actuated diaphragm or a bimetallic member Provides the motion necessary to move a valve member or open and close a set of electrical contacts for controlling the oven heating element. The accuracy and repeatability of the aforementioned oven control thus depends on the mechanical sensitivity of the sensing element and the ability to calibrate such an element to provide the desired movement over a range of desired oven temperatures.

In ovens which provide a self-cleaning mode of operation the heating element is operated to raise the oven to a temperature substantially above that of normal service use for a period of time to oxidize carbonaceous food residue on the oven walls. In such a self-cleaning mode of operation, providing accurate calibration and accurate sensitivity over such a broadened range of temperatures has proven to be difficult in designing and manufacturing a low cost oven controller for high volume mass production of ovens. Problems have been encountered in sealing and calibrating the liquid filled tube or bulb; and, where highly corrosive and toxic liquid metal fills are employed, hazardous conditions result in manufacturing the liquid filled bulb.

Furthermore, it has been found that in the manufacture of bimetal sensors for oven thermostats a high degree of precision is required to control the composition of the bimetal element and the control of the thickness dimensions thereof in order to produce accurate and repeatable movement of the bimetal element over the range of temperatures experienced in the oven to provide repeatable mechanical motion at a given temperature.

It has thus been desired to find a way or means of inexpensively employing an electronic controller for providing response to changes in oven temperatures and to provide a control signal for energizing an electrical power actuator to control the oven heating unit in an effort to utilize the accuracy and reliability of electronic circuitry to eliminate the problems encountered in providing repeatability and the desired sensitivity of mechanical motion in an oven controller.

SUMMARY OF THE INVENTION

The present invention provides an electronic controller or control system for an oven heating unit and employs solid state electronic means for generating a control signal in response to sensed oven temperature signal. The oven temperature signal is compared with a reference signal provided by user input to a selector or control. A predetermined hysteresis is provided electrically to the comparator to effect a positive and negative deadband about the selected temperature in which the comparator does not change state to effect activation or deactivation of the oven heating unit. The electrical hysteresis is provided by a reversible polarity voltage regulator including a resistive voltage divider having a pair of reversely poled diodes.

The present invention includes additional comparator means operative to disable the heating element relay in the event of over-temperature or failure of the temperature sensor in the oven.

The present invention, thus, provides a simple and low-cost electronic controller which is easily set or calibrated by choice of resistors in a voltage divider for a desired deadband about a selected regulation temperature and which eliminates the need for costly microprocessors and digital encoding and decoding circuitry.

BRIEF DESCRIPTION OF THE DRAWING

The circuit of the present invention is illustrated schematically in the drawing.

DETAILED DESCRIPTION

Referring to the drawing, the control circuit is indicated generally at 10 and has a power supply section indicated at 12 by dashed outline as having input connector terminals 14, 16 adapted for connection to a typical 120-volt AC household power line, preferably through a line power switch (not shown). The terminals 14, 16 are connected to the primary coil of transformer T1 which reduces the voltage. In the present practice, the voltage is reduced to 14–18 volts at its secondary coil which is connected across opposite sides of a full wave rectifier bridge indicated generally at 18.

Bridge 18 includes diodes CR1, CR2 connected to be forward and reverse biased by one lead of the secondary coil, and diodes CR3, CR4 connected to be oppositely biased with respect to the remaining transformer secondary coil lead. Diodes CR1, CR4 are connected in reverse polarity to ground and diodes and CR2, CR3 are connected with forward polarity to power lead 20 which is connected to the input of a regulator U2. Capacitors C1, C2 which are grounded provide filtering.

Regulator U2 provides a regulated 12–15 volts with capacitor C3 connected to the output and grounded for additional filtering. The 12–15-volt output of U2 is designated $V_{cc}$ along lead 22 and is the power source for the entire control circuit.

A temperature sensor indicated generally at 23, typically of the nickel or platinum wire (RTD) or platinum film RTD type, is disposed in an oven 24 indicated by dashed outline in the drawing; and, the aforesaid RTD sensor is connected by connector terminals 26, 28 to input connector terminals 30, 32 with the latter terminal grounded which comprise the input of the temperature sensing circuit 34 indicated by dashed outline in the drawing. The signal from a temperature sensor 23 from terminal 30 is denoted $V_{RTS}$ and comprises the unamplified temperature sensor signal for use in the circuit 10.

In the presently preferred practice, the temperature sensor is a platinum or nickel RTD-type device which has its resistance value proportional to temperature. The presently preferred platinum sensor device should be chosen such that its resistance is approximately expressed as $$R = 2T + 950$$

where R is the sensor resistance in Ohms, and T is the oven temperature in degrees Fahrenheit.

The presently preferred nickel wire RTD sensor device has manufacturer's designation 63555-2 and is obtainable commercially from Eaton Corporation, Controls Division, 191 East North Avenue, Carol Stream, Ill. 60188.

The power supply voltage $V_{cc}$ is applied through series resistors R32 and R4 to the input line 31 and is in series with the resistance of sensor 23 thereby forming a voltage divider. $V_{RTS}$ is, thus, determined by the following ratio:

$$V_{RTS} = \left[ \frac{RTS}{(RTS + R4 + R32)} \right]$$

The voltage $V_{RTS}$ is applied to the noninverting input of an operational amplifier U1A with a filtering capacitor C5 connected thereto and grounded. The negative input of amplifier U1A is connected to junction 36 and grounded through resistor R6. The output of U1A is connected through a filtering network comprising series resistors R55, R50 and capacitors C12, C13 connected to ground and to the positive input of amplifier U1D with its output connected to the negative input thereof to yield a gain of 1. The output of amplifier U1D is connected through junction 38 and through resistor R7 and junction 40 to the noninverting input of a temperature-compensating comparator U1B which forms a part of the element control circuit 42.

The negative input of comparator U1B receives a reference or desired temperature level signal $V_{SET}$ from a suitable source such as a user controlled potentiometer described hereinafter. The output of the temperature comparator U1B is connected to junction 44 which is connected through resistor R9 to junction 46 which is connected through resistor R8 to junction 40. Junction 46 is also connected to junction 48 which is connected through forward biased diode CR5 and reverse poled diode CR6 to junction 38. The output of the element control 42 at junction 44 is applied through resistor R13 to junction 52 and to the base of transistor switch Q1 which has its emitter connected to $V_{cc}$. Junction 52 is also biased by $V_{cc}$ through resistor R23.

The output of switch Q1 at the collector is applied to junction 54 and through resistor R36 to one lead of the primary coil 56 of the oven heating element relay indicated generally at 58. The other lead of the relay coil 56 is connected to the emitter of fault switch Q3 which has its collector grounded; and, Q3 is operative upon a switching voltage applied to its base to control current flow through the coil 56. The relay 58 is operative to control current flow to the oven heating elements such as the bake and broil element 60, 62. In the presently preferred application of the control system of the present invention, the bake and broil elements comprise resistive heating devices; however, it will be understood that alternatively relay 58 may be connected to operate an electrically actuated valve for controlling fuel flow to a gaseous fuel burner.

The voltage $V_2$ applied to the relay coil 56 through resistor R36 is attenuated in time by parallel capacitor C14, which forms an R-C circuit with R36 and has the time constant thereof chosen to provide full charging of C14 within a few seconds to thereby reduce the voltage to the ON coil 56 such that, after initial pull-in, the coil 56 is held in the ON state at a reduced voltage and current during the remainder of the ON time of the heating element.

In operation of the element control circuit 42, as the oven temperature drops and cools the temperature sensor 23, the voltage $V_{SENS}$, which is the amplified voltage $V_{RTS}$ falls. In the presently preferred practice, the amplifier U1A has a gain of approximately 23.1 such that the voltage $V_{SENS}$ at junction 38 is high enough to drive the comparator U1B.

In the presently preferred practice of the invention, a typical oven sensor 23 will have a resistance of approximately 30.1 Ohms at 350 degrees Fahrenheit which is a typical household oven cooking temperature. A temperature of 350 degrees F. is approximately the mid range of the oven in the "BAKE" mode, not taking into consideration the elevated temperatures encountered in the CLEAN mode of operation wherein temperature of approximately 900 degrees Fahrenheit may be experienced. The voltage is expressed by the following formula:

$$V_{SENS} = (23.1) \, V_{cc} \left[ \frac{RTS}{(R32 + R4 + RTS)} \right],$$

where 23.1 is the gain of U1A.

In the presently preferred practice, where the values of R32 and R4 are taken from Table IV herein and substituted into the above expression, a value of $V_{SENS} = 6.52$ volts is obtained at 350 degrees Fahrenheit.

The operation of the element control circuit 42 in normal "BAKE" mode of operation is as follows: When the temperature of the oven is lower than the selected temperature, that is, when $V_{SENS}$ is less than $V_{SET}$, by a predetermined differential, the output of comparator U1B will be "LOW" and the switch Q1 will enable the relay coil 56 to energize the elements 60, 62 by relay switch 58. With the output of the comparator U1B "LOW", diode CR6 is forward biased by $V_{SENS}$ causing a fixed voltage drop of about 0.6 volts across R7 and R8. This results in the voltage $V_{IN}$ at junction 40 to be less than $V_{SENS}$. $V_{SENS}$ and $V_{IN}$ increase with increasing oven temperature (increasing $V_{RTS}$) until $V_{IN}$ exceeds $V_{SET}$ thereby causing the output of the comparator to change to the "HIGH" state causing temperature switch Q1 to disable the relay coil 56, causing the relay 58 to shut "OFF" the heating elements 60, 62. It will be understood that because $V_{IN}$ was lower than $V_{SENS}$ the relay 58 was not turned "OFF" until the oven temperature, e.g. $V_{SENS}$, was above the selected value, $V_{SET}$, at the point where $V_{IN}$ equaled $V_{SET}$, thereby giving a positive hysteresis to the "ON" cycling of the heating element. It will be understood that the voltage to the noninverting input of comparator U1B is expressed by the following formula:

$$V_{IN} = V_{SENS} - 0.6 \text{ V} \left[ \frac{R7}{(R7 + R8)} \right]$$

If the output of comparator U1B at junction 44 is designated $V_{OUT}$ and has either a "HIGH" or "LOW" output the comparator operation may be expressed by the logic of Table I.

TABLE I

| TEMPERATURE COMPARATOR | | |
|---|---|---|
| $V_{IN}$ | | $V_{OUT}$ |
| (23.1) $V_{RTS} - 0.6 \text{ V} \left[ \frac{R7}{R7+R8} \right] < V_{SET}$ | | LO |
| (23.1) $V_{RTS} - 0.6 \text{ V} \left[ \frac{R7}{R7+R8} \right] > V_{SET}$ | | PREV. STATE |
| (23.1) $V_{RTS} + 0.6 \text{ V} \left[ \frac{R7}{R7+R8} \right] < V_{SET}$ | | PREV. STATE |
| (23.1) $V_{RTS} + 0.6 \text{ V} \left[ \frac{R7}{R7+R8} \right] > V_{SET}$ | | HI |

The change of output state of comparator U1B causes diode CR6 to be reversed biased and diode CR5 to be forward biased. This causes the voltage $V_{IN}$ at junction 40 to now be slightly greater than $V_{SENS}$ as the oven temperature falls with the heating element "OFF". When the oven temperature has dropped sufficiently that $V_{IN}$ falls below $V_{SET}$, the output state of comparator U1B will once again change, thereby causing Q1 to energize coil 56 and cause relay 58 to turn the heating elements 60, 62 "ON". It will be understood that $V_{IN}$ was slightly greater than $V_{SET}$ during this part of the cycle. The relay coil 56 was not energized until the oven temperature was slightly below the selected value, e.g., $V_{SENS}$ less than $V_{SET}$, thereby providing negative hysteresis. It will be understood that the expressions in Table I are based upon the preferred gain of 23.1 for amplifier U1A; however, the expressions may be modified by substituting for the numeral 23.1 the appropriate number for amplifier U1A having a different gain.

A fault comparator circuit 64 indicated in dashed outline comprises a comparator U3C, voltage divider resistors R30, R31 and feedback resistor R34. The noninverting line of comparator U3C receives an input fault signal denoted FS in the drawing and is biased by the voltage divider in accordance with the following expression:

$$V_F = V_{cc} \times \left[ \frac{R31}{R30 + R31} \right]$$

The negative input of comparator U3C receives a voltage proportional to $V_{RTS}$ along line 65 which is buffered by amplifier U1C having a gain of 1. When the output of fault comparator U3C is "LOW" fault switch Q3 conducts and relay coil 56 energizes relay 58. The values of resistors R30, R31 are chosen to set $V_F$ equal to a value corresponding to an oven temperature of minus twenty degrees Fahrenheit ($-20$ degrees F.). Thus, if $V_F$ is less than $V_{RTS}$ the comparator output is "LOW", and Q3 remains conductive. However, in the event that $V_{RTS}$ is below the value of $V_F$, the sensor is considered to be shorted, and U3C conducts thereby turning Q3 "OFF" and disabling the relay 58 to turn the oven heating elements "OFF".

The logic of the comparator U3C is set forth below in Table II.

TABLE II

| FAULT COMPARATOR | | |
|---|---|---|
| $V_{RTS}$ | FS | $V_{OUT}$ |
| $> V_{CC} \left[ \frac{R31}{R30+R31} \right]$ | $V_{CC} \left[ \frac{R31}{R30+R31} \right]$ | LO |
| $> V_{CC} \left[ \frac{R31}{R30+R31} \right]$ | HI | HI |
| $< V_{CC} \left[ \frac{R31}{R30+R31} \right]$ | $V_{CC} \left[ \frac{R31}{R30+R31} \right]$ | HI |
| $< V_{CC} \left[ \frac{R31}{R30+R31} \right]$ | HI | HI |

A temperature fail detection circuit is indicated in dashed outline and denoted by reference numeral 67 in the drawings. The circuit 67 comprises a comparator U3A having the oven temperature sensor voltage $V_{RTS}$ applied to the noninverting input thereof through junction 66. A preset fraction of the reference voltage $V_{SET}$ is applied to the negative input of U3A from voltage divider junction 68 which is disposed between resistors R1, R2. $V_{SET}$ is applied to R1; and, R2 is grounded. The output of temperature fail comparator U3A is applied along lead 70 and through diode CR10 to a failure signal output junction 72. The lead 70 has a junction 74 which is biased through resistor R16 by the voltage $V_2$ from the temperature switch Q1 at junction 54. Lead 70 also has connected thereto a diode CR14 which applies the voltage from junction 74 through resistor R41 as a positive feedback to junction 66 and the positive input of comparator U3A.

Temperature fail comparator U3A is operative to conduct only when $V_{RTS}$ has gone to a level representative of an oven temperature above the selected temperature set point by approximately 50 degrees F. This is achieved by the voltage divider R1, R2 providing a reference voltage $V_{REF}$ at junction 68 that is less than $V_{SET}$. It will be understood that for purposes of description, the output of comparator U3A along lead 70 at junction 74 is denoted as $V_{OUT}$ and is applied to junction 72 and denoted $F_S$ in the drawing.

The voltage $V_2$ applied through resistor R16 to junction 74 is only "HIGH" when the switch Q1 is conducting and fault switch Q3 is conducting to permit current flow through the relay coil 56. When $V_{RTS}$ is greater than and Q3 is conducting, the fault circuit 67 provides an output. When $V_{RTS}$ is less than the voltage at junction 68, fault circuit 67 does not provide an output.

As $V_{OUT}$ goes "HIGH" from comparator U3A, R41 is placed in parallel with R32 and R4 of the voltage divider for the temperature resistive sensor; and, by appropriate choice of R41, the parallel combination produces a $V_{RTS}$ equivalent of 660 degrees F. in the oven when $V_{RTS}$ is the equivalent of 350 degrees F. In this event, $V_{RTS}$ is sufficiently high to prevent the energization of the oven heating element. The diode CR14 provides a latching of U3A in the event a fault is seen.

Only after the A.C. power line has been removed and reapplied to the control after the oven cools will the comparator U3A allow the oven relay 58 to function.

The logic of the comparator U3A in circuit 67 is set forth below in Table III.

TABLE III

| TEMPERATURE FAIL COMPARATOR | | |
| --- | --- | --- |
| $V_{RTS}$ | $V_2$ | $V_{OUT}$ |
| $< V_{SET}\left[\dfrac{R2}{R2 + R1}\right]$ | HI | LO |
| $< V_{SET}\left[\dfrac{R2}{R2 + R1}\right]$ | LO | LO |
| $> V_{SET}\left[\dfrac{R2}{R2 + R1}\right]$ | HI | HI |
| $> V_{SET}\left[\dfrac{R2}{R2 + R1}\right]$ | LO | LO |

The circuit 67 thus provides that the backup or fault temperature will track or follow the set point.

A similar lock fail circuit indicated by reference numeral 76 and shown in dashed outline is provided and comprises a comparator U3B having the output thereof connected along line 78 through diode CR8 to junction 72. Positive feedback is provided from the output line 78 through diode CR13 and resistor R29 to the positive input line junction 80. The output line 78 is biased through resistor R14 by voltage V1 which is generated by switch Q2 conducting the cause current flow to a door lock relay indicated generally at 82, which has a primary coil 84 thereof series connected through fault switch Q4 to ground.

Comparator U3B receives at its negative input a voltage $V_{LF}$ from a voltage divider comprising resistors R21 and R22 which is powered by $V_L$ from a voltage divider comprising resistors R27, R25, R26 in series and resistor R15 and tapped at the junction 83 between resistors R26 and R15. The voltage $V_{LF}$ is compared with $V_{RTS}$ in comparator U3B to protect against a failure in the lock circuit. When $V_{RTS}$ is greater than $V_{LF}$, and V1 is "HIGH", U3B conducts through junction 72 to provide a fault signal to U3C preventing Q3 from enabling current flow to coil 56 of relay 58 and thereby maintaining the heating elements 60, 62 disabled.

If Q2 has not been turned "OFF" by the lock comparator U4C, V1 will remain "HIGH"; and, the oven will be turned "OFF" due to the voltage FS at junction 72 driving the fault comparator U3C. The positive feedback loop for comparator U3B forces $V_{RTS}$ at the input of U3B to a very high value causing U3A to shut down the oven relay and requires power to be removed to disable the latching from the positive feedback.

With the oven door interlock switch 52 moved to the "LOCKED" position shown in dashed outline in the drawing, the voltage from junction 87 between resistors R25 and R26 is applied through connector terminals 86, 88, switch 52 and terminal 56, 54 to the negative input of temperature comparator U1B ($V_{SET}$). The temperature comparator U1B is then operative to enable the oven temperature to rise to the level of approximately 900 degrees Fahrenheit for the "CLEAN" mode of operation. In the "CLEAN" mode of operation, temperature control is maintained as above described with respect to oven operation in the "BAKE" mode.

It will be understood that with oven door lock switch 52 throw to the "UNLOCKED" position shown in solid outline in the drawings, the switch receives a signal through connector terminals 90, 92 and lead 94 connected to connector terminal 96 and the variable output connector terminal 98 of oven control potentiometer 100 which comprises variable resistor R11 with the wiper user-movable to a selected position corresponding to a desired temperature indicated on a dial (not shown). The resistor R11 is powered through connector terminals 102, 104, the latter of which is connected via lead 106 to series resistors R10 and adjustable calibration resistor R3.

It will be understood that the potentiometer resistor R11 is grounded through terminals 108, 110 and resistor R12.

The voltage at junction 87 is applied to the comparator U1B as $V_{SET}$ in the "CLEAN" mode of operation and is determined from the expression:

$$V_{SET} = V_{cc}\left[\frac{(R26 + R15)}{(R27 + R25 + R26 + R15)}\right]$$

and, the voltage $V_L$ at junction 83 is given by the expression:

$$V_L = V_{cc}\left[\frac{R15}{(R27 + R25 + R26 + R15)}\right]$$

The voltage $V_{LF}$ at junction 85 is given by the formula $$V_{LF} = V_L\left[\frac{R22}{R21 + R22}\right].$$

A bake calibration fail circuit denoted by reference numeral 112 comprises comparator U4A resistors R42, R43, R47, R49 and diode CR11. The positive input of U4A receives the voltage $V_A$ from lead 106 to connector 104. The negative terminal of U4A receives a voltage from a voltage divider network comprising variable resistors R42 and R43 series connected and resistors R44 and R45 with R45 grounded. The voltage applied to the negative input of U4A may be characterized by the expression:

$$V_{cc}\left[\frac{(R44 + R45)}{(R42 + R43 + R44 + R45)}\right].$$

In the presently preferred practice R44+R45 is maintained equal to 5.6K Ohms. R47 serves as a positive feedback loop to the positive terminal of U4A; and, the output line 114 thereof is applied through diode CR11 to junction 115 which provides the fault signal output applied to the input line of fault comparator U3C. The output line 114 of U4A is biased positively by a voltage comprising $V_{cc}$ applied through resistor R49.

In the event of an open or short in the bake calibration resistor string, e.g., R3, R10, R11, R12, comparator U4A is operative to provide a fault signal to U3C to turn off Q3 and disable coil 56 and relay 58 for shutting off the oven heating elements.

A "CLEAN" calibration fail circuit 116 is provided and comprises comparator U4B receiving a voltage $V_L$ at its positive input, and having its negative input connected to junction 118 from the voltage divider comprising resistors R42, R43, R44, and R45 with the voltage at junction 118 expressed by the formula:

$$V_{LR} = V_{cc}\left[\frac{R45}{(R42 + R43 + R44 + R45)}\right].$$

Positive feedback resistor R46 connects the output line 120 of comparator U4B with the positive input thereof; and, the output line 120 is biased through resistor R48 to Vcc and provides its output through diode CR12 to junction 115 for providing a fault signal FS. In operation, in the event of a failure in the CLEAN calibration resistor string comprising resistors R27, R25, R26, R15, R21 and R22, the voltage $V_L$ at the positive terminal of U4B provides an output in line 120, thereby causing comparator U3C to conduct and turn fault switch Q3 off to disable the oven heating element relay 58.

A lock comparator U4C compares the amplified voltage $V_{SENS}$ from comparator U1A through resistor R20 at its positive input, with $V_L$ applied at the negative input thereof. U4C provides its output along line 120 through resistor R18 to the base of switch Q2. A positive feedback resistor R17 is provided. The voltage $V_L$ represents a temperature just above the normal operating range of the oven. In the event the oven temperature should exceed a set value in the range 550-600 degrees Fahrenheit, the output of U4C will go "HIGH" causing Q2 to cutoff thereby cutting off current to coil 84 of relay 82 and de-energizing the lock relay switch 122 preventing the lock lever (not shown) from being moved to the unlocked position to prevent opening of the oven door.

When fault comparator U3C goes "HIGH", at its output along line 124 to the noninverting input of comparator U3D, U3D then also goes "HIGH" at its output along line 125. U3D has its negative input connected to voltage divider network comprising a center tap between resistors R52 and R53 and, when U3D turns fault switch Q4 "OFF" current flow is stopped through coil 84 to thereby disable relay 82 and also the lock relay switch 122.

The unity gain amplifier U1C provides isolation of $V_{RTS}$ from the fault comparator U3C at the negative input thereof.

The low voltage circuitry of the present invention is protected at various locations against spurious AC signals by capacitors C5 through C13 which are connected from the signal line to ground. The values of the resistances and capacitances employed in the presently preferred practice are given in Table IV set forth below.

TABLE IV

RESISTANCES AND CAPACITANCES

| R | Ohms | R | Ohms | C | ufarads |
|---|---|---|---|---|---|
| 1- | 100 Meg, 1% | 19 - | 62, 5%, ¼ W | 1 - | 220 |
| 2- | 45.3K, 1% | 20 - | 4.75K, 1% | 2 - | 0.1 |
| 3,27,42 - | 2K, 5% | 21 - | 1 Meg, 1% | 3 - | 47 |
| 4- | 348, 1% | 22 - | 53.6K, 1% | 5,11 - | 0.1 |
| 5- | 22.1K, 1% | 23,24 - | 3.9K, 5% | 12,13 - | .047 |
| 6- | 1K, 1% | 25 - | 1.3K, 1% | 14 - | 100 |
| 7,26 - | 3.01K, 1% | 29,41 - | 470, 5% | | |
| 8,30 - | 220K, 5% | 31 - | 1.1K, 5% | | |
| 9,56 - | 10K, 5% | 32 - | 1.54K, 1% | | |
| 10- | 2.43K, 1% | 34 - | 1 Meg, 5% | | |
| 11- | 2K, 20% | 36 - | 200, 5%, ¼ W | | |
| 12- | 1.24K, 1% | 43 - | 2.21K, 1% | | |
| 13- | 8.2K, 5% | 44 - | 110, 1% | | |
| 14,16,49 - | 3.6K, 5% | 45 - | 5.49K, 1% | | |
| 15- | 6.34K, 1% | 46,47 - | 1.6 Meg, 5% | | |
| 17- | 221K, 1% | 48,49 - | 3.6K, 5% | | |
| 18- | 8.2K, 5% | 50,55 - | 220K, 5% | | |
| | | 51,53 - | 47K, 5% | | |

In the presently preferred practice the various solid state components were obtained from Motorola Electronics Corp., Schaumberg, Ill.; and, the amplifiers designated U1 have manufacturer's identification LM224. Device U2 bears manufacturer's identification MC7815CT; and devices U3 and U4 are designated LM239 by the manufacturer. Switches Q1 through Q4 are industry standard type 2N4402 transistor switches.

The present invention thus provides a unique and novel low-cost electronic temperature regulating control system for controlling oven heating elements and may be employed with either electric resistance oven heaters or electrically operated valves for gaseous fuel burners. The present invention provides for regulation of oven temperature by comparing a reference temperature signal generated by a potentiometer set by the user with an oven temperature signal from an oven temperature sensor. The comparator is operative to cycle the heating element relay when the comparison indicates that the oven temperature is less than or greater than the reference temperature by a predetermined level. Feedback of the comparator output is provided by a reversible polarity voltage regulator comprising reversely poled diodes and a resistive network. The feedback circuit provides both positive and negative hysteresis about the set point and permits the comparator output to remain unchanged so long as the oven temperature is within the positive and negative hysteresis band.

Separate latching comparator networks are provided to drop out and latch out the oven heating element relay in the event of an over-temperature in all modes of operation. A separate comparator circuit is latched to disable the solenoid operated oven door lock mechanism in the event of an over-temperature oven condition in the "CLEAN" mode of operation.

The present invention thus provides a unique and novel low-cost electronic oven control system which prevents unnecessary cycling or hunting of the heating element to maintain a desired selected oven temperature and yet provides such a control circuit without the need for costly microprocessor devices.

Although the invention has hereinabove been described with respect to the illustrated embodiment and in the presently preferred mode, it will be understood that the invention is capable of modification and variation by those skilled in the art and is limited only by the following claims.

We claim:

1. An electronic control system for an oven heating unit comprising:
   (a) relay means operative upon receipt of an electric control signal to energize said heating unit;
   (b) temperature sensing means disposed to sense the temperature in said oven and operative t provide an electrical indication thereof;
   (c) selector means operative to provide an electrical reference signal in response to a user-selected temperature setting;
   (d) means including a logic device having said reference signal connected to an input thereof operative to compare the level of said electrical temperature indication with the level of said reference signal and operative to provide an output signal only when said oven temperature signal is at predetermined differential from said reference temperature signal level;
   (e) hysteresis means connected to another input of said logic device and receiving said oven temperature signal and operable to maintain a predetermined positive and negative bias on said electrical temperature indication comparison during which the output remains unchanged of said means operative to compare.

2. The system defined in claim 1, wherein said hysteresis means includes forward and reverse biased diodes and resistance means connected between said oven temperature signal line and the output of said comparator means.

3. The electronic control system defined in claim 1, further comprising:
   (a) fail comparator means connected to receive at one input thereof said oven temperature signal and a predetermined fraction of the level of said reference signal at a second input thereof and operative to provide an output signal indicative of a comparison of said inputs;
   (b) means biasing the output of said fail comparator means with an operating voltage of said relay means;
   (c) feedback means operative to apply said output bias to said one input of said fail comparator means; wherein said fail comparator means is operative to provide an output only when the level of sensed oven temperature signal is equal to or greater than said fraction of the level of said reference signal.

4. An electronic control system for an oven heating unit comprising:
   (a) relay means operative upon receipt of an electric control signal to energize said heating unit;
   (b) temperature sensing means disposed to sense the temperature in said oven and provide an electrical temperature signal having the level thereof indicative of oven temperature;
   (c) selector means operative to provide an electrical reference signal level in response to a user selected temperature setting; and,
   (d) switch means connected to a source of electrical current and having a two state output and operative to compare the level of temperature signal and said reference signal and operative to change output state only when said temperature signal differs positively or negatively from said reference signal by more than a predetermined amount, said switch means operative to maintain its previous output state when said temperature signal level is equal to or differs from said reference signal positively or negatively by an amount less than said predetermined amount, said switch means including a device having feedback means comprising a reversible polarity voltage regulator means connected between the output and the oven temperature signal input thereto, wherein the output of said switch means comprises said control signal.

5. The control system defined in claim 4, further comprising malfunction detector switch means operative to compare the level of said oven temperature signal with a predetermined fraction of the level of said reference temperature level, and upon said comparison exceeding a predetermined differential said detector switch means operative to disable said relay means if said relay means is enabled, and including means operative, upon disablement of said relay means, to latch the output of said detector means until power has been cut off and the system reset.

6. The control system defined in claim 4, further comprising fault comparator means operative to compare said temperature signal and said reference signal and to disable said relay means, when enabled, in the event said temperature sensing means is shorted.

7. The control system defined in claim 4 wherein said switch means includes feedback means employing a reversible polarity voltage regulator.

8. The control system defined in claim 4, wherein said switch means includes feedback means having a reversible polarity resistive voltage divider.

9. The control system defined in claim 4, wherein said switch means includes a resistive voltage divider and oppositely poled diodes.

* * * * *